Sept. 16, 1958  W. GLAMANN  2,852,084
POWER TRANSMISSION CONSTRUCTION FOR SUPERCHARGED
INTERNAL COMBUSTION ENGINES
Filed Nov. 16, 1954  6 Sheets-Sheet 1

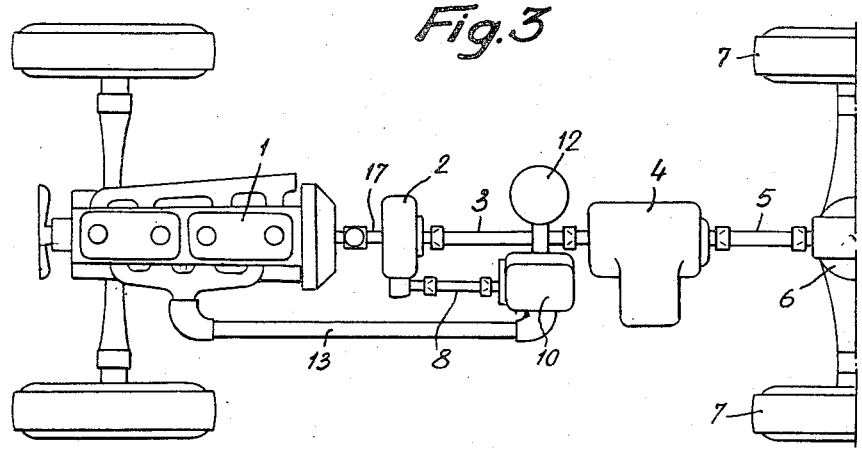
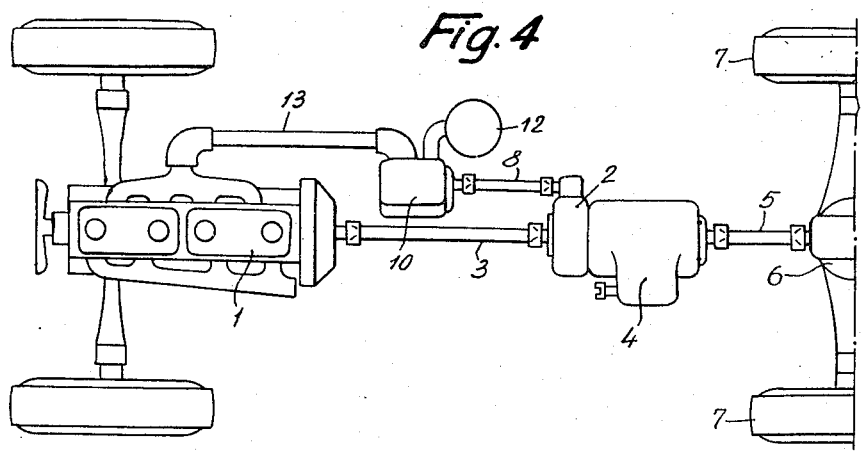

Sept. 16, 1958   W. GLAMANN   2,852,084
POWER TRANSMISSION CONSTRUCTION FOR SUPERCHARGED
INTERNAL COMBUSTION ENGINES
Filed Nov. 16, 1954   6 Sheets-Sheet 5

Sept. 16, 1958   W. GLAMANN   2,852,084
POWER TRANSMISSION CONSTRUCTION FOR SUPERCHARGED
INTERNAL COMBUSTION ENGINES
Filed Nov. 16, 1954   6 Sheets-Sheet 6
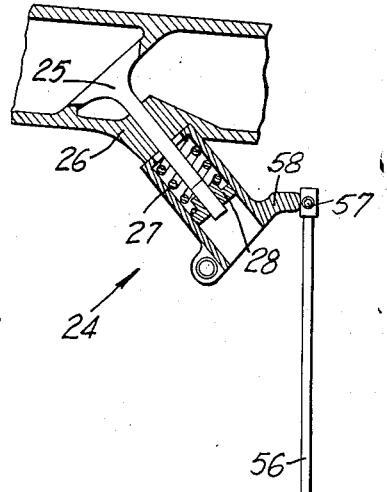
FIG. 11.
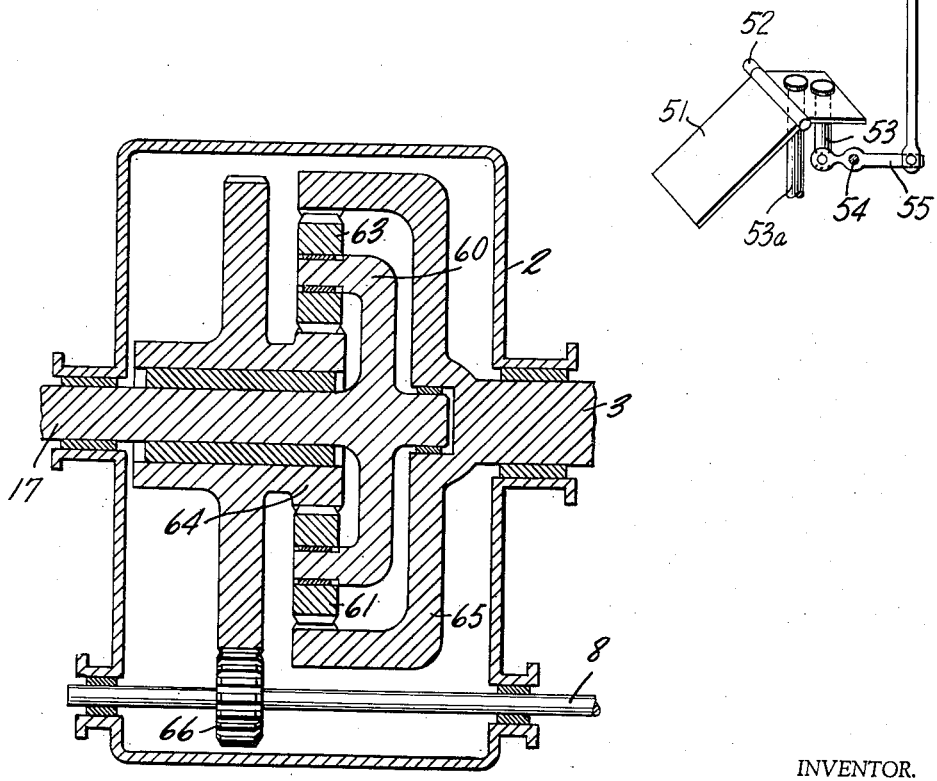
FIG. 12.
INVENTOR.
WILHELM GLAMANN
BY
ATTORNEY

United States Patent Office 2,852,084
Patented Sept. 16, 1958

2,852,084

POWER TRANSMISSION CONSTRUCTION FOR SUPERCHARGED INTERNAL COMBUSTION ENGINES

Wilhelm Glamann, Lyons, France

Application November 16, 1954, Serial No. 469,247

Claims priority, application France November 19, 1953

12 Claims. (Cl. 180—54)

The invention relates to automobile vehicles in which the engines are fitted with auxiliary supercharging apparatus and relates more particularly to the combination, the operation and the arrangement of such auxiliary apparatus on the vehicle.

It is known in motor vehicles for the engine to drive a compressor by means of a differential train of gears, the power output of the engine being sub-divided, one part of the power being transmitted to the mechanism driving the vehicle wheels and the other part being transmitted to drive the compressor.

It is also known to fit the usual internal combustion engines with a turbo-compressor arranged to be driven by the exhaust gases of the engine and to discharge compressed air for use in the engine. This arrangement is adapted to increase the engine power and to reduce fuel consumption but it has the disadvantage that the value of the engine torque is increased as an ascending function of the engine speed instead of as a descending function. In practice, it is only at high engine speeds that the supply of exhaust gases becomes sufficient to drive the turbo-compressor efficiently and this supply increases with the speed.

According to the invention, and in the case of an automobile vehicle of heavy weight, the supercharging compressor, connected to the distributing box by a Cardan shaft, the turbo-compressor if the latter is provided, and the differential gear train are located in a horizontal plane passing through the vehicle axles, at a substantial distance to the rear or in front of the engine, and a long connecting pipe is provided between the compressor and the engine, the greater part of which is also located in the plane above mentioned. This arrangement provides for efficient cooling of the air circulating in the connecting pipe by the travelling wind, without the danger of striking against obstacles during travel. The pipe may also be fitted if desired with cooling ribs or vanes.

According to another feature of the invention, the discharge pipe from the compressor and the inlet pipe to the turbine of the turbo compressor are connected by a pipe fitted with an admission member which provides for the passage of compressed air for driving the turbine. The extent of the automatic energisation may be regulated by means of the admission member to enable it to be used frequently whenever great pulling power is necessary in the course of travel.

In cases where the vehicle is not fitted with a turbocompressor for effecting supercharging in two stages, the discharge pipe of the compressor can, in conformity with the invention, again be connected to the exhaust pipe of the engine in front of an exhaust silencer device, which is thus common to the engine and to the compressor. The supply of air to exhaust, for example on the stopping and starting of the vehicle, is then regulated by means of an exhaust member connected in the pipe which connects the compressed air and exhaust pipes.

Such a discharge device may comprise, for example where a centrifugal compressor is used, a one-way valve operating automatically to exhaust compressed air when the supercharging pressure exceeds a given value.

The invention also relates to an efficient arrangement on the vehicle of the compressor and of the differential gear train associated therewith, and also of the turbo-compressor, when the installation includes this latter device.

Various constructional forms of motor lorries or motor coaches made in accordance with the invention will now be described, by way of non-limiting examples, with reference to the accompanying drawings, in which.

Figure 7:
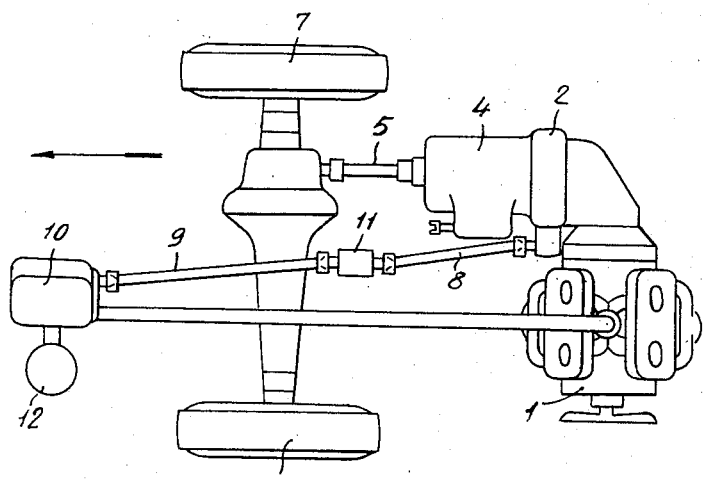
Figure 8:
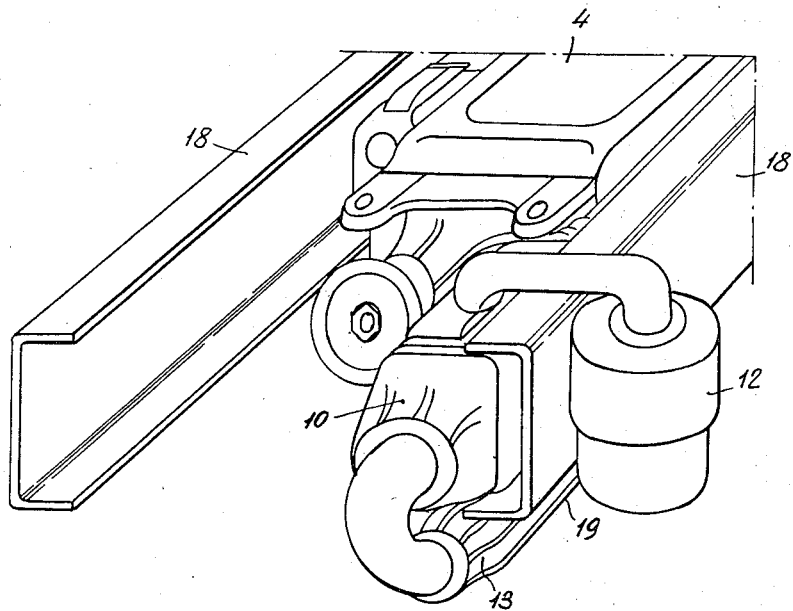
Figure 9:
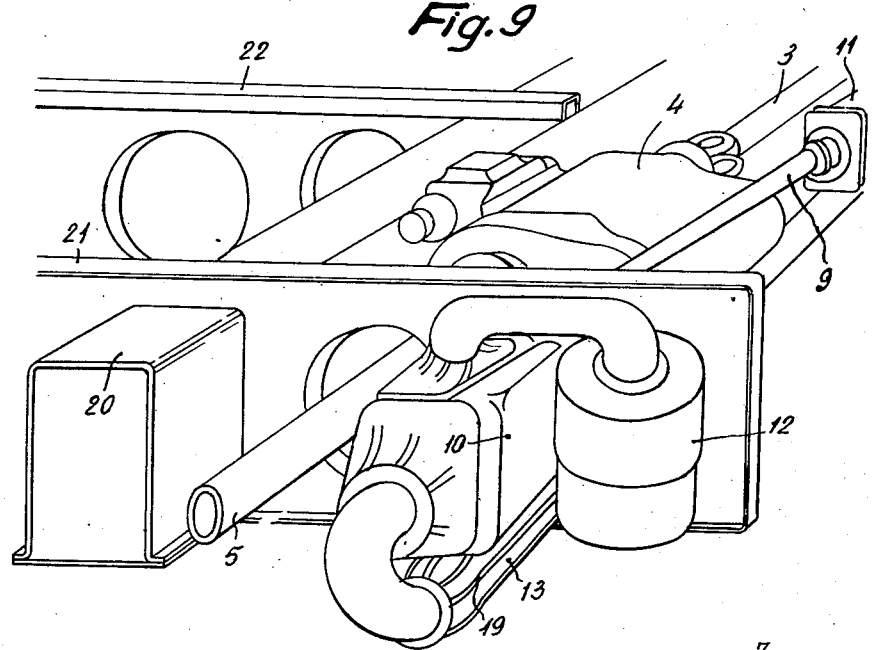
Figure 10:
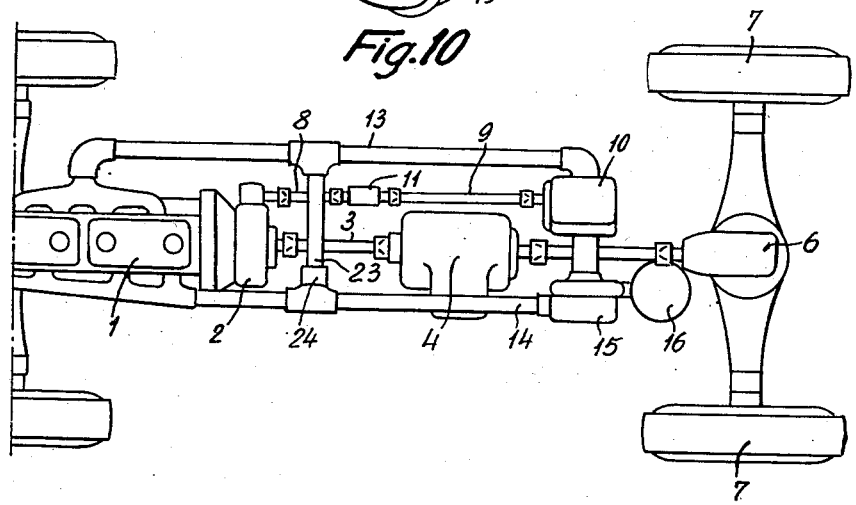

Figs. 3 to 6 respectively illustrate various constructional forms illustrating various arrangements of the supercharging apparatus;

Fig. 7 illustrates a supercharging apparatus for a vehicle in which the engine is at the rear;

Fig. 8 illustrates a constructional detail of the arrangement of the supercharging apparatus on a chassis comprising two side members;

Fig. 9 illustrates a constructional detail of a similar arrangement on a chassis comprising a central beam or girder;

Fig. 10 illustrates an arrangement of the supercharging apparatus which includes means for by-passing or short-circuiting the compressed air pipe;

Fig. 11 is a side elevational view partly in section to show details of valve construction of an arrangement for controlling the supercharging circuit through a pedal linkage; and Fig. 12 is a longitudinal sectional view of the casing 2 of Fig. 3.

Figure 1:
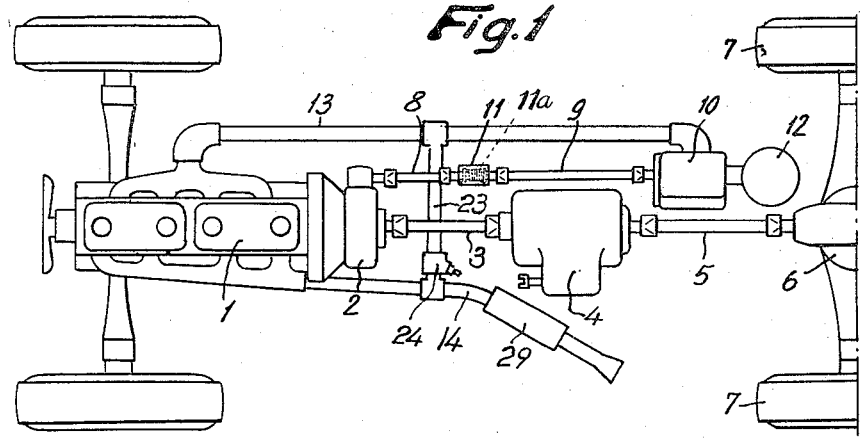
Fig. 1 illustrates a plan view of the driving mechanism for a lorry fitted with a compressor and with a drive therefor comprising a differential gear train.

As shown in Fig. 1 at the output end of the engine 1, there is mounted a box 2 containing a conventional differential gear train. The box 2 drives a transmission shaft 3 connected to a change speed box 4 arranged to drive a second transmission shaft 5 which transmits the drive to the rear axle 6, the mechanism of which drives the driven wheels 7.

The differential train located in the box 2 also drives, through the intermediary of Cardan shafts 8 and 9, a supercharging compressor 10. The shafts 8 and 9 are connected by a flexible coupling 11 which, in a particular constructional form, consists mainly of a helical spring 11a, the axis of which is substantially identical with the axes of the shafts 8 and 9. One end of this spring is connected to the output end of the shaft 8, whilst the other end is fixed to the input end of the shaft 9. The force of the spring is designed so as to transmit the driving torque to the compressor whilst permitting an angular deformation of about 90° between the idle operation of the compressor and the operation at full torque.

The compressor 10 is supplied through a filter 12 and the supercharging air is transmitted to the engine through a pipe 13, the latter being fitted with longitudinally cooling ribs, not shown in Fig. 1.

The pipe 13 is connected by a pipe 23 to the exhaust pipe 14 connected to an exhaust silencer device 29. In the pipe 23 is located a supply member 24 which can, for example, consist of a valve. The exhaust pipe 14 thus discharges the air which in some operating conditions of the vehicle, the member 24 allows to pass out of the supercharging circuit.

According to one particular form of construction, the supercharging compressor 10 is a centrifugal compressor and the supply member 24 is a device discharging by superpressure, as shown in Fig. 11, and operating automatically to exhaust compressed air as soon as the pressure of the latter exceeds the calibrated value of the spring force which presses the valve on to its seat.

Figure 2:
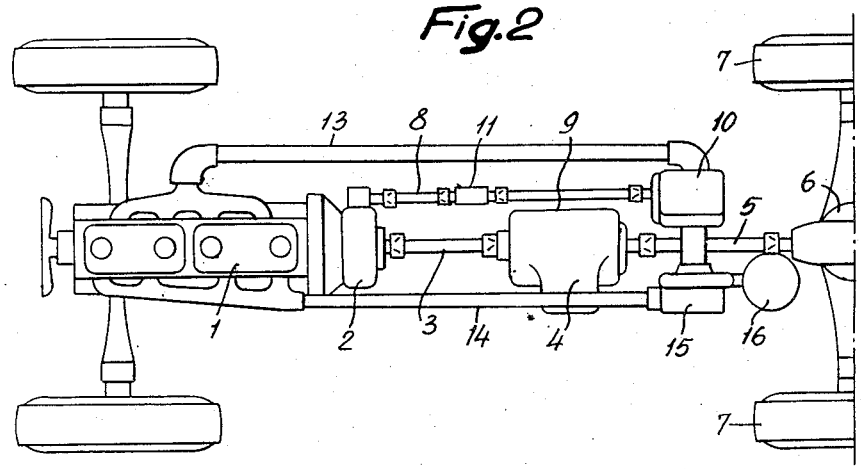
Fig. 2 is a view similar to Fig. 1 but including a turbocompressor.

When the supercharging of the engine is to be reinforced by the action of a turbo-compressor, the latter can, for example, be arranged as shown in Fig. 2. The exhaust gases coming from the engine 1 are led by the pipe 14 to a turbo-compressor 15, the latter being supplied through a filter 16. The air discharged by the turbo-compressor 15 is passed into the compressor 10 and the compressed air in the latter is passed to the engine 1 through the pipe 13. The supercharging of the engine is thus effected in two stages, the first stage being effected in the turbo-compressor 15 and the second stage in the compressor 10.

In practice, the change speed box 4 is, in this form of construction, disposed substantially in the centre of the space comprised between the engine 1 and the rear axle 6. The compressor 10 and the turbo-compressor 15 are disposed behind the box 4, on opposite sides respectively of the transmission shaft 5. The air filter 16 is disposed in the space available in front of the rear axle and behind the turbo-compressor.

In the constructional form shown in Fig. 3 which shows a vehicle fitted only with a supercharging compressor, driven by a differential gear train, the change speed box 4 is positioned somewhat to the rear of the position which it occupies in Fig. 2. The available space between the engine 1 and the change speed box now being greater, all the parts relating to the supercharging are mounted therein. In this arrangement, the differential gear train is driven by a transmission shaft 17 connected to the engine 1 and itself drives the change speed box 4 through the shaft 3 and the compressor 10 through the shaft 8. The compressor 10 and the filter 12 are disposed on opposite sides of the shaft 3. The air for supercharging passes through the pipe 13. This arrangement has the advantage that it reduces the length of the driving transmission of the compressor and of the supercharging pipe. The differential gear train which is of conventional construction and corresponds to the gear train 2 shown in Figs. 1 and 2 is illustrated in Fig. 12. Thus, the transmission shaft 17 is connected to the satellite carrier 60 supporting the satellites 61 and 63 which mesh with the crown 65 connected to an extension of the shaft 3 which, as shown in Fig. 3, is a Cardan shaft and the satellites also mesh with the wheel 64 which in turn, by means of the pinion 66, is connected to Cardan shaft 8.

Fig. 4 shows a construction in which whilst the position of the change speed box as above described is retained, the differential train contained in the box 2 is rigidly connected directly with the box 4. The transmission shaft 8 then extends forwardly, the compressor 10 is closer to the engine 1, and the length of the pipe 13 is still further reduced.

Figure 5:
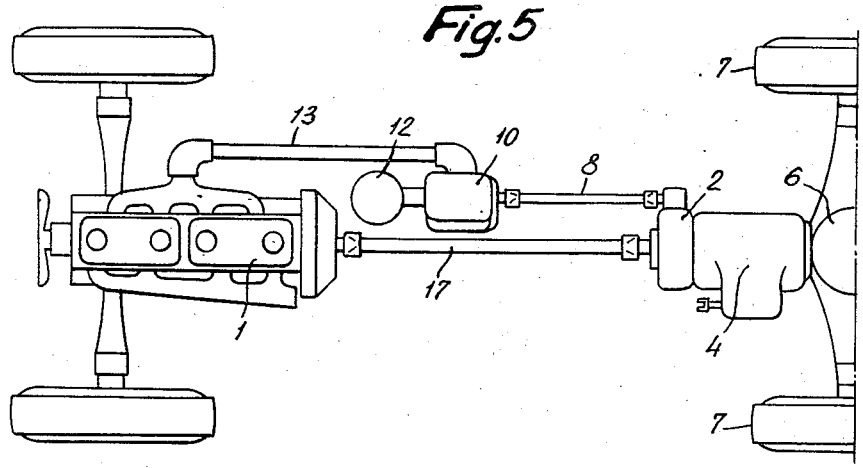

Another arrangement of the various parts in conformity with the invention is illustrated in Fig. 5. In this figure, the differential train 2 and the change speed box 4 are disposed in proximity to the rear axle 6, whilst the drive is transmitted forwards by the shaft 8.

Figure 6:
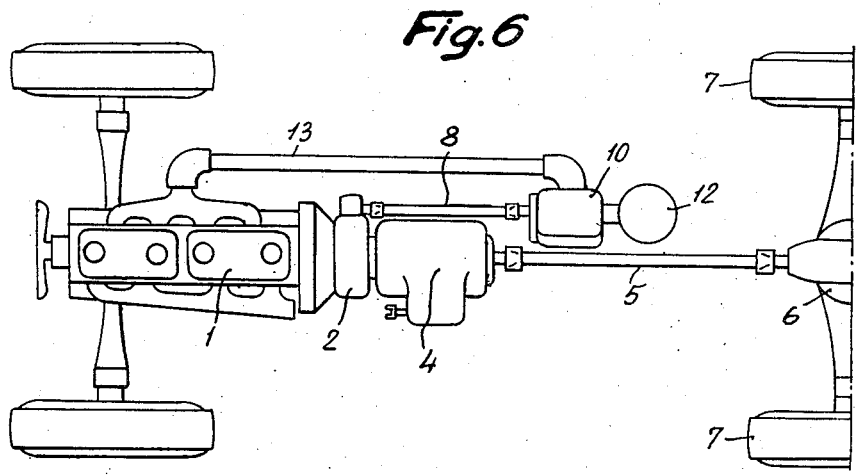

Finally, Fig. 6 shows a reverse arrangement, in which a differential train located in the box 2, and the change speed box 4 are disposed immediately behind the engine, whilst the compressor 10 and the filter 12 are disposed close to the transmission shaft driving the mechanism of the rear axle.

One constructional form suitable for a vehicle in which the engine is at the rear (a coach, for example) is shown in Fig. 7. In this arrangement, the engine 1 drives a differential train contained in the box 2, which drives a change speed box 4 and, through the transmission shaft 5, the driven wheels 7, and also drives the compressor 10 through the shafts 8 and 9 and the coupling 11, as above described in connection with Fig. 1. The compressor 10 and the filter 12 are disposed between the front and rear axles of the vehicle.

Figs. 8 and 9 illustrate respectively the manner in which the various parts can be arranged in relation to the chassis of the vehicle.

In the arrangement shown in Fig. 8, the chassis comprises two U-shaped side members, the change speed box 4 being located along the axis of the chassis between these side members. In order to utilize the profile of the side members, the compressor 10 is, for example, partly fitted in the recess provided by the U-section, as clearly shown in the figure. Compressed air is fed to the engine (not shown) through the pipe 13 which is provided with longitudinal ribs 19. The filter 12 is, in this constructional form, disposed outside the chassis. When the chassis is formed of side members of other cross-section, for example of T or I cross section the spaces or recesses available will be used in a similar manner.

In a chassis comprising a central beam 20 (Fig. 9), the various parts of the supercharging apparatus are also arranged according to the principles above explained. In the space between the central beam 20 on the one part and the cross-members 21 and 22 on the other part are disposed the shaft 3 from the differential train (not shown) and terminating at the change speed box 4, the shaft 5 driving the rear wheels, the coupling 11, the shaft 9 driving the compressor 10, the filter 12 and the pipe 13 conveying the compressed air to the engine (not shown), this pipe being fitted with longitudinal ribs 19 to facilitate cooling of the air.

Fig. 10 shows a supercharging circuit in conformity with the invention and including the parts providing for automatically energizing the device. To this end, the pipe 13, conveying compressed air to the engine 1, is connected by a transverse pipe 23 to the pipe 14, supplying the turbo-compressor 15 with exhaust gas.

This pipe 23 is fitted close to its junction with the pipe 14 with a control member 24 comprising, for example, a check valve or, as shown in Fig. 11, a one-way valve 25. As shown in Fig. 11, this valve 25 is guided in a boss 26 and held on its seat by a spring 27, the pressure of which can be adjusted by means of a nut 28. This pressure, which opposes short-circuiting of the device, can be fixed, the arrangement then operating as a discharge member actuated by superpressure, or regulated as a function of the fuel supply per engine cycle, for example by coupling its regulation to the position of the gas pedal as shown at 51, which is pivoted at 52 and is connected to control the pressure on the valve 25 by a linkage 53, 54, 55, 56, 57, which acts on a member 58 which is pivoted at 59, the member 58 receiving the nut 28 which in turn threadedly engages the stem of the valve 25. The connection to the accelerator mechanism is indicated at 53a. A separate gas pedal may be provided for its regulation, which would have the construction shown in Fig. 11 with the connection 54 eliminated. On depressing this separate gas pedal, the supply of fuel per engine cycle is increased at the same time as the pressure of the spring 27 is regulated in consequence.

I claim:

1. In a wheeled automotive vehicle having an internal combustion engine, a chassis frame and front and rear axles supporting the wheels of the vehicle, compressor means for supercharging the engine with compressed air, means for driving the air compressor means from the engine, and conduit means connecting the outlet of the compressor means to the engine for supplying compressed air to said engine, said means for driving the air compressor means from the engine comprising a differential gear having one gear element connected to the engine, a second gear element connected by a Cardan shaft to at least one of the vehicle axles, and a third gear element connected by a Cardan shaft to the air compressor means, said means for driving said air compressor means and at least the major portion of said conduit means being disposed substantially in the horizontal plane which passes through the vehicle chassis frame, said compressor means being disposed at a substantial longitudinal distance from said engine, whereby the conduit means is of substantial length, and at least the major portion of the compressor means and the differential gear being disposed in the space defined by the elements of the chassis frame.

2. In a wheeled automotive vehicle having an internal combustion engine, a chassis frame and front and rear axles supporting the wheels of the vehicle, compressor means for super-charging the engine with compressed air, means for driving the air compressor means from the engine, and conduit means connecting the outlet of the compressor means to the engine for supplying compressed air to said engine, said means for driving the air compressor means from the engine comprising a differential gear having one gear element connected to the engine, said vehicle further comprising a change-speed gear unit, a second element of said differential gear connected by a Cardan shaft and through said change-speed gear unit to at least one of the vehicle axles, and a third element of said differential gear connected by a Cardan shaft to the air compressor means, said means for driving said air compressor means and at least the major portion of said conduit means being disposed substantially in the horizontal plane which passes through the vehicle chassis frame, said compressor means being disposed at a substantial longitudinal distance from said engine, whereby the conduit means is of substantial length, and at least the major portion of the compressor means and the differential gear being disposed in the space defined by the elements of the chassis frame.

3. An automotive vehicle as defined in claim 2, wherein the differential gear and the change speed gear are disposed on the longitudinal axis of the vehicle, and the compressor means is mounted in the space between the change speed gear and the rear axle, and wherein the Cardan shaft connected to the compressor means comprises a flexible coupling.

4. An automotive vehicle as defined in claim 2, wherein the differential gear and the change speed gear are disposed on the longitudinal axis of the vehicle, and the compressor is mounted in the space between the change speed gear and the rear axle, and wherein the Cardan shaft connected to the compressor comprises two Cardan shaft elements, one of which is driven by the differential gear and the other of which is connected to the compressor means, the two shaft elements being connected together by a flexible coupling comprising a helical spring.

5. An automotive vehicle as defined in claim 2, wherein the differential gear and the change speed gear are disposed on the longitudinal axis of the vehicle, and the compressor means is mounted in the space between the engine and the change speed gear.

6. An automotive vehicle as defined in claim 1, wherein the engine is mounted at the rear of the vehicle and the compressor is disposed between the front and rear axles.

7. An automotive vehicle as defined in claim 1, wherein the chassis comprises two profiled side members and wherein the compressor means is disposed partly in a recess defined at the side of one of the profiled side members.

8. An automotive vehicle as defined in claim 1, wherein the chassis comprises a central beam and a transverse member and wherein the compressor is disposed in said transverse member.

9. An automotive vehicle as defined in claim 1, wherein the engine has an exhaust conduit and the compressed air conduit connecting the compressor means to the engine is connected to the engine exhaust conduit through a valve-controlled pipe whereby when the valve is open compressed air will be exhausted through the engine exhaust conduit.

10. An automotive vehicle as defined in claim 1, wherein the compressed air conduit connecting the compressor means to the engine is provided with cooling ribs.

11. An automotive vehicle as defined in claim 1, further comprising a turbo-compressor adapted to be driven by the engine exhaust gases and to supply compressed air into the compressor means driven from the engine, thus providing a two stage compression system.

12. An automotive vehicle as defined in claim 1, further comprising a turbo-compressor, the inlet of the latter being connected to the discharge of the compressor means driven by the engine by a valve controlled pipe, whereby when the valve is opened, compressed air from said compressor means is by-passed to the inlet of the turbo-compressor to drive the latter.

References Cited in the file of this patent

UNITED STATES PATENTS

| | | |
|---|---|---|
| 1,546,708 | Booth | July 21, 1925 |
| 2,149,785 | Neugebauer | Mar. 7, 1939 |
| 2,232,992 | Alexander | Feb. 25, 1941 |
| 2,328,141 | Haltenberger | Aug. 31, 1943 |
| 2,419,807 | Wilcox | Apr. 29, 1947 |
| 2,467,077 | Brunken | Apr. 12, 1949 |

FOREIGN PATENTS

| | | |
|---|---|---|
| 519,513 | Great Britain | Mar. 2, 1940 |